(No Model.)

D. O. PATTON.
COLLAR.

No. 269,228. Patented Dec. 19, 1882.

Witnesses
Jacob L. Rowe
C. Vandiker

Inventor
David O. Patton
Per Geo. A. Mosher
Atty.

UNITED STATES PATENT OFFICE.

DAVID O. PATTON, OF BRUNSWICK, NEW YORK.

COLLAR.

SPECIFICATION forming part of Letters Patent No. 269,228, dated December 19, 1882.

Application filed August 16, 1882. (No model.)

*To all whom it may concern:*

Be it known that I, DAVID O. PATTON, a citizen of the United States, residing in the town of Brunswick, county of Rensselaer and State of New York, have invented a new and useful Improvement in Collars, of which the following is a specification.

This invention relates to certain improvements in the art of manufacturing shirt-collars; and the objects of the improvements are to provide a cheap and convenient mode of making a heavy seam and stiffening the edges of a collar, so that it will not easily bend or warp out of its proper shape, thoroughly stayed to launder, and will resist moisture of neck, &c., when in use. I attain this object by constructing the collar in the manner illustrated in the accompanying drawings, in which—

Figure 1:
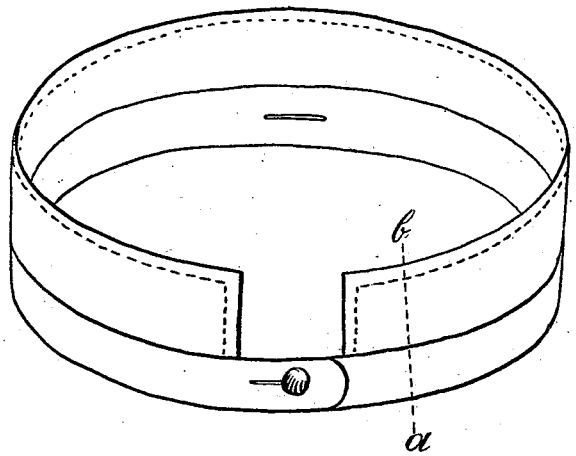
Figure 3:
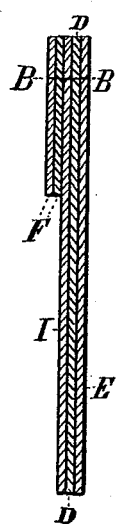
Figure 2:
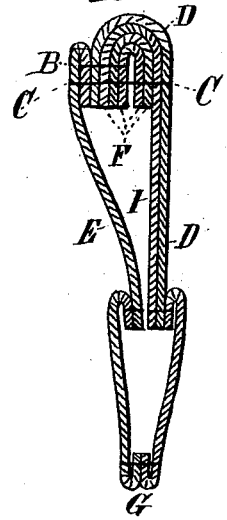

Figure 1 is a perspective view of a standing collar. Fig. 2 is a cross-section of the same, taken at the dotted line $ab$ in Fig. 1. Fig. 3 is a cross-section of the plies of cloth forming the body of the collar and of the stiffening strips or plies as they appear when first stitched together.

Similar letters of reference refer to similar parts throughout the several views.

Figs. 2 and 3 are exaggerated in form to more clearly show the relative position of the several plies.

D represents the outer ply or face of the body of the collar and E the inner ply, while I represents one or more intermediate plies.

The narrow strips or plies F are first stitched at or near the upper edges, as at B, to the body-plies D, E, and I, as shown in Fig. 3. The ply E and the other plies, D, F, and I, are then bent or turned to the position shown in Fig. 2, when they are all again stitched together at or near the line C, including the edges already stitched at B. The collar-band G is then attached in the usual manner, as shown in Fig. 2.

The stitching C is shown by the dotted lines in the upper part of the collar in Fig. 1.

There may be any desired number of stiffening-plies F.

Fig. 1 represents a standing collar, but a turn-down collar may be constructed in the same manner with reference to the stiffening-plies F, the upper portion or body of the collar, as shown in Fig. 2, being turned or bent down alongside of the band G.

By constructing collars in the manner thus described the exposed edges may be cheaply made of any desired stiffness without rendering the body of the collar too heavy, thereby securing economy in material and durability of shape, the moisture arising from the body of the wearer not easily affecting the edges of the collar when re-enforced, as described. The stitching C C, in addition to the stitching B, is material, since it passes through every edge in the body, after it has been turned right side out, of the collar, thereby holding all the parts by the double stitches, and strengthening the collar while being laundered.

When two plies F are required I prefer to use a folded strip instead of two separate strips.

I am well aware of the use of outside stiffening-plies in a cuff; but such form of construction is wholly inapplicable to a collar. When stiffening-plies have been used in cuffs they have been stitched to the body-plies in such a manner that when turned in the process of manufacture the narrow plies are exposed to view and their loose or free edges stitched down upon the surface of the cuff. In my invention the re-enforcing plies are wholly concealed from view between the body-plies of the finished collar, and there is no seam exposed to view except an ornamental row of stitching, C, which presents the appearance common to most collars.

My improvement in collars is also wholly inapplicable to cuffs which are turned through an opening, afterward concealed by folding and stitching down over it one or more narrow plies, which plies also serve secondarily to stiffen the edges of the cuff, and I hereby disclaim the application of my invention, as above described, in any way whatever to cuffs.

What I claim as new, and desire to secure by Letters Patent, is—

In a shirt-collar, the combination of two or more body-plies, D and E, one or more narrow concealed edge-strips, F, the stitching B and C, and a collar-band, G, all arranged for the purposes stated.

DAVID O. PATTON.

Witnesses:
BENJ. H. HALL,
GEO. A. MOSHER.